United States Patent [19]

Cannata

[11] Patent Number: 5,200,623
[45] Date of Patent: Apr. 6, 1993

[54] DUAL INTEGRATION CIRCUIT

[75] Inventor: Robert Cannata, Santa Barbara, Calif.

[73] Assignee: Grumman Aerospace Corp., Bethpage, N.Y.

[21] Appl. No.: 804,221

[22] Filed: Dec. 4, 1991

[51] Int. Cl.[5] .................................... H04N 5/33
[52] U.S. Cl. ............................ 250/338.1; 250/332
[58] Field of Search ............... 250/338.1, 370.08, 330, 250/332; 358/113

[56] References Cited

U.S. PATENT DOCUMENTS

| | | | |
|---|---|---|---|
| 3,479,496 | 11/1969 | Buesch et al. | 235/183 |
| 3,493,961 | 2/1970 | Hansen | 340/347 |
| 3,588,876 | 6/1971 | Chatelon et al. | 340/347 |
| 3,668,291 | 6/1972 | Slana | 179/15 |
| 3,737,897 | 6/1973 | Cuthbert et al. | 340/347 |
| 3,787,668 | 1/1974 | Currie et al. | 235/152 |
| 3,932,755 | 1/1976 | Sagawa | 250/349 |
| 3,970,875 | 7/1976 | Leehan | 307/304 |
| 3,975,648 | 8/1976 | Tobey, Jr. et al. | 307/297 |
| 3,978,472 | 8/1976 | Jones | 340/347 |
| 4,004,148 | 1/1977 | Howard et al. | 250/370 |
| 4,007,415 | 2/1977 | Toyoda | 323/19 |
| 4,064,448 | 12/1977 | Eatock | 323/22 |
| 4,152,595 | 5/1979 | Garfinkel et al. | 307/350 |
| 4,179,691 | 12/1979 | Keller | 340/567 |
| 4,243,885 | 1/1981 | Agouridis et al. | 250/370 |
| 4,243,974 | 1/1981 | Mack | 340/347 |
| 4,257,057 | 3/1981 | Cheung et al. | 357/16 |
| 4,303,861 | 12/1981 | Ekstrom | 250/370 |
| 4,399,464 | 8/1983 | Hix et al. | 358/113 |
| 4,418,335 | 11/1983 | Genahr | 340/565 |
| 4,431,920 | 2/1984 | Srour et al. | 250/370 |
| 4,435,652 | 3/1984 | Stevens | 307/297 |
| 4,499,416 | 2/1985 | Koike | 323/303 |
| 4,528,549 | 7/1985 | Simpson | 340/347 |
| 4,612,442 | 9/1986 | Toshimichi | 250/353 |
| 4,617,549 | 10/1986 | Reiner | 340/347 |
| 4,633,086 | 12/1986 | Parrish | 250/338 |
| 4,734,582 | 3/1988 | Gibbons et al. | 250/332 |
| 4,786,831 | 11/1988 | Morse et al. | 307/490 |
| 4,804,863 | 2/1989 | Welland et al. | 307/227 |
| 4,829,302 | 5/1989 | Oitzl et al. | 341/165 |
| 5,013,919 | 5/1991 | Solomon | 250/349 |
| 5,039,879 | 8/1991 | Parrish | 307/353 |
| 5,084,704 | 1/1992 | Parrish | 341/164 |
| 5,101,108 | 3/1992 | Gaalema et al. | 250/332 |

FOREIGN PATENT DOCUMENTS

| | | | |
|---|---|---|---|
| 59-60380 | 4/1984 | Japan | 250/369 |
| 60-146165 | 8/1985 | Japan | 250/349 |
| 63-44135 | 2/1988 | Japan | 250/349 |

OTHER PUBLICATIONS

Electronics, "Series-pass IC regulators still the perennial favorite", Feb. 3, 1977, pp. 96–100.
Analog-Digital Conversion Handbook, 1986, pp. 32–33.
Infrared Detectors, "Detectivity and Preamplifier Considerations for Indium Antimonide Photovoltaic Detectors", 1959, pp. 1524–1527, Proc. IRE 47(9).

Primary Examiner—Carolyn E. Fields
Attorney, Agent, or Firm—Stetina and Brunda

[57] ABSTRACT

A dual integration circuit is disclosed for extending the dynamic range of on focal plane signal processor used in a space based infrared detection system. The circuit comprises an input port in connection with a dedicated detector element and first and second integration circuits operative to generate an output signal responsive to a detected infrared image. The first and second integration circuits are provided with associated switching circuitry for generating output signals at different times to facilitate detection of objects having bright and dim infrared images.

4 Claims, 2 Drawing Sheets

DUAL INTEGRATION CIRCUIT

FIELD OF THE INVENTION

The present invention relates generally to electronic signal processing circuitry and, more particularly, to a dual integration circuit for varying the integration period of multiple channel infrared detector systems to allow detection of both bright and dim targets.

BACKGROUND OF THE INVENTION

Current infrared detector systems incorporate arrays of large numbers of discrete, highly sensitive detector elements, the outputs of which are connectable to sophisticated processing circuitry. By rapidly analyzing the pattern and sequence of detector element excitations, the processing circuitry can identify and monitor sources of infrared radiation. A contemporary subarray of detectors may contain 256 detectors on a side, or a total of 65,536 detectors. The size of each square detector may be approximately 0.009 cm on a side with 0.00127 cm spacing between detectors. Such a subarray would therefore be 2.601 cm on a side. The subarray may, in turn, be joined to form an array that connects many millions of detectors. As might be expected, the processing requirements for such a highly populated and closely spaced array are strenuous, particularly considering the demands of a space environment.

The response of the infrared detector elements and their associated electronic processing channel is preferably linear with an output in volts per watt of absorbed infrared radiation. A DC offset is associated with each detector and signal processing channel and is defined as fixed pattern noise. The detector response and DC offset are unique for each channel, i.e. they are different for each channel but all within a given range of values. Satisfactory detector input circuits exist to reduce or eliminate noise while providing near unity gain and stable operation. One such circuit is disclosed in U.S. Pat. No. 4,633,086 for INPUT CIRCUIT FOR INFRARED DETECTOR, issued to William J. Parrish, and assigned to the common assignee hereof.

A further requirement particularly significant in highly populated infrared detection systems, concerns the circuit for normalizing gain among the analog signal channels. Gain normalization to a high level is required by the sophisticated algorithms which analyze the detector array outputs. The variation in gain from detector channel to another increases the dynamic range requirements for the output amplifier when detector channels are multiplexed into a common output amplifier. The dynamic range of the analog-to-digital converter and the signal processing hardware must likewise have sufficient dynamic range to handle the multiplexed data. Increasing the dynamic range requirements of the output amplifier, analog-to-digital converter, and signal processing hardware results in an increase in system weight and cost. Therefore, it is desirable to maintain the best possible uniformity in gain among all detector channels. One suitable gain normalization circuit is disclosed in U.S. Pat. No. 5,039,879 for GAIN NORMALIZATION CIRCUIT, issued to William J. Parrish, and assigned to the common assignee hereof.

Having addressed the concern of noise and gain normalization, the signal processing circuitry must further have a sufficient range of response to accurately identify and quantify inputs from both dim targets and bright targets. For example, the infrared detection system must be sufficiently sensitive to distinguish and quantify dim infrared images corresponding to particular events of interest. However, the circuit must also produce an accurate response, i.e. avoid saturation, when a bright target is detected. The present invention addresses these concerns by providing a dual integration circuit which utilizes a long integration period to detect and quantify dim targets, as well as a short integration period for detecting and quantifying bright targets. In view of the constraints of highly populated, space based systems, the present invention implements a dual integration circuit in each channel of the infrared detection system, on the same chip as the input and gain normalization circuitry.

SUMMARY OF THE INVENTION

A dual integration circuit is disclosed for extending the dynamic range of on focal plane signal processor used in a space based infrared detection system. The circuit comprises an input port in connection with a dedicated detector element and first and second integration circuits operative to generate an output signal responsive to a detected infrared image. The first and second integration circuits are provided with associated switching circuitry for generating output signals at different times to facilitate detection of objects having bright and dim infrared images.

In the presently preferred embodiment, the first integration circuit produces an output signal representative of a target having a bright infrared image, and the second integration circuit generates an output signal representative of an object having a dim infrared image.

The first and second integration circuits output at different times corresponding to the different integration of each circuit. In the presently preferred embodiment, the second integration circuit, corresponding to a long integration time, generates an output signal after a time equal to sixteen times the length of the period of the short integration circuit.

The dual integration circuit may further be provided with analog-to-digital conversion circuitry for receiving outputs from the first and second integration circuit and generating a responsive digital output signal representative of a composite of signals from the first and second integration circuits.

In the preferred embodiment, the dual integration circuit is implemented on an integrated circuit chip which is supported by a module which also supports multiple detector elements. A plurality of dual integration circuits may be formed on a single integrated circuit chip useful in a space based infrared detection system.

DETAILED DESCRIPTION OF THE PREFERRED EMBODIMENT

The detailed description set forth below in connection with the appended drawings is intended merely as a description of the presently preferred embodiments of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

Figure 1:
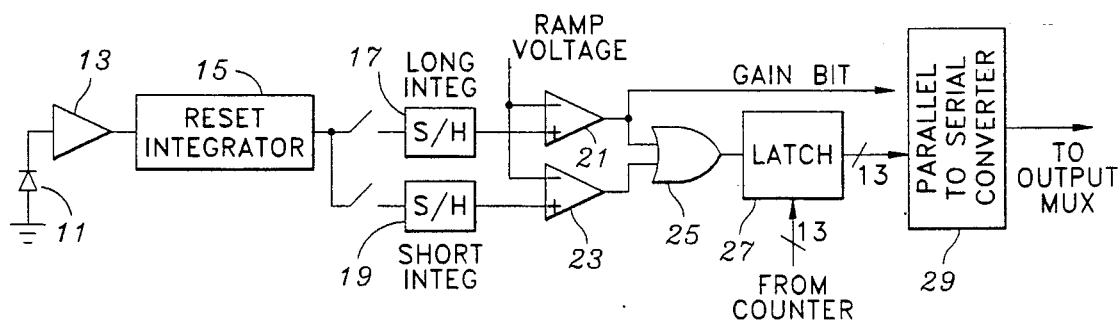
FIG. 1 is a block diagram illustrating the operation of the dual integration circuit.

FIG. 1 is a high level representation of the present invention in conjunction with a detector input circuit and an analog-to digital (A/D) converter. The circuitry illustrated at FIG. 1 represents a single channel circuit, dedicated to processing the output signal of a single detector element 11. It is to be understood that the circuitry illustrated at FIG. 1 may be repeated for each detector element in the array. In the presently preferred embodiment the circuitry of FIG. 1 is repetitively implemented many times on a single chip disposed adjacent the detector focal plane. A suitable module for supporting such chips adjacent the detector focal plane is illustrated in U.S. Pat. No. 4,659,931 for HIGH DENSITY MULTI-LAYERED INTEGRATED CIRCUIT PACKAGE, issued to Schmitz et al. Such modules are suitable to support a substantial number of such chips in electrical communication with both the individual detector elements and off-focal plane processing circuitry. It is to be understood, however, that the broader aspects of the present invention are not intended to be limited to use in conjunction with a particular type of module or detector array.

Referring again to FIG. 1 detector element 11 responds to an infrared frequency signal to generate an output which is communicated to the suitable input amplifier circuit 13. In practice amplifier circuit 13 may be implemented as an input amplifier effective to reduce interchannel offset and normalize interchannel gain, as described above. Thereafter the signal is communicated to reset integrator 15 described in more detail below. The output of reset integrator 15 is simultaneously communicated to long integration circuit 17 and short integration circuit 19. The long integration circuit 17 is useful for small signals and the short integration circuit 19 is useful for large signals, which would normally saturate the associated integration capacitance by the end of a long integration period. In practice the long integration circuit 17 and short integration circuit 19 may be implemented as sample and hold circuits as described in more detail below. The long integration circuit is the equivalent of a high gain mode, while the short integration circuit is the equivalent of a low gain mode. The outputs of integration circuits 17 and 19 are communicated to an A/D converter consisting of comparators 21, 23, OR gate circuit 25 and latch circuit 27. The appropriate digital count is then communicated to the parallel to serial converter 29 and then to the chip output multiplexer (not shown). If the long integration channel saturates, the short integration signal is sent to the output along with the gain bit indicating the short integration sample is being used.

In the preferred embodiment, each sampled signal is converted using a 13-bit A/D converter so that 13-bit resolution may be obtained for signals from both short integration circuit 17 and long integration circuit 19.

Figure 2:
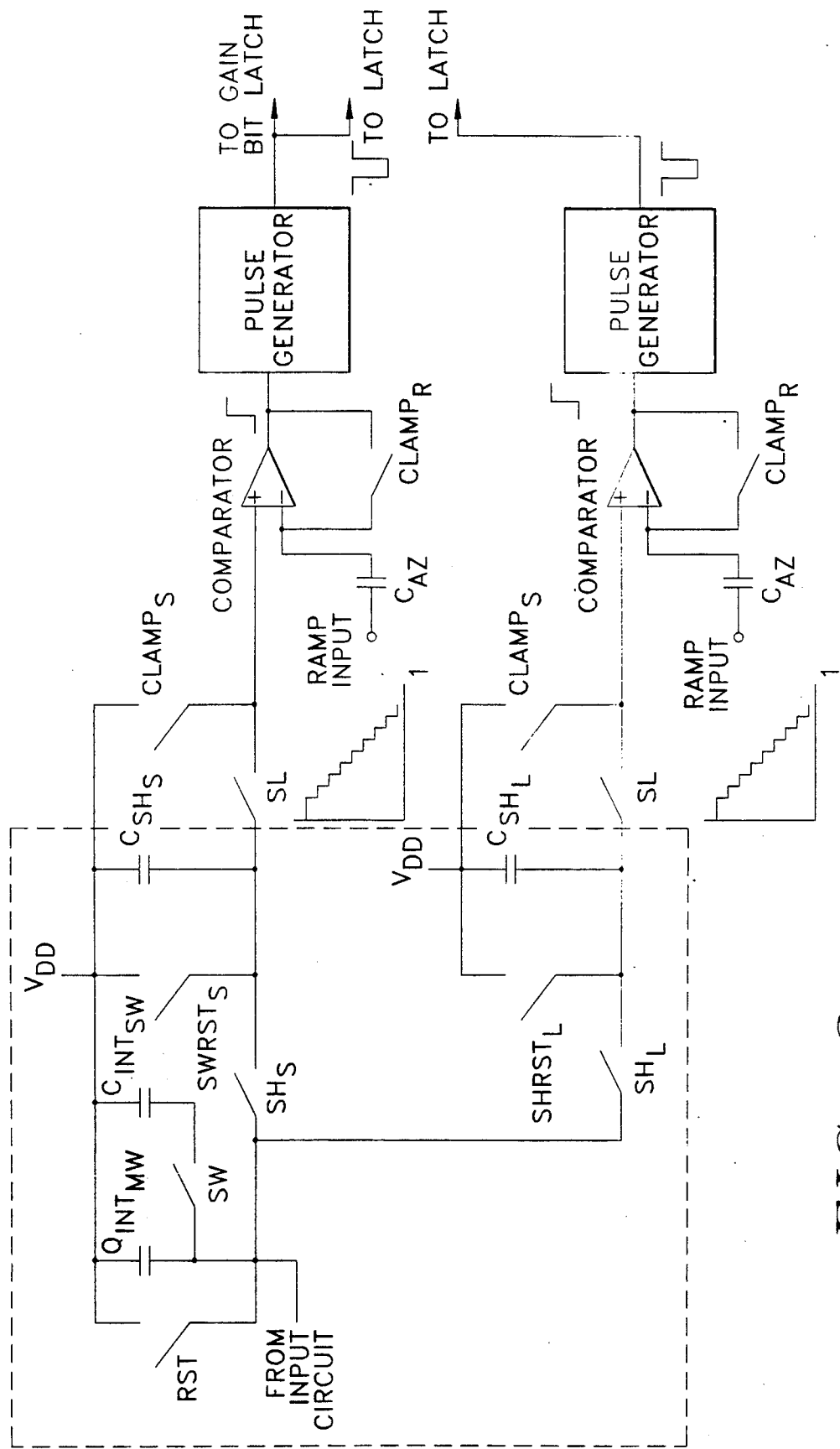
FIG. 2 is a more detailed schematic representation of the dual integration circuit illustrated at FIG. 1.

FIG. 2 illustrates in more detail a portion of the circuitry represented at FIG. 1. As shown at FIG. 2 the reset integrator 15 may be formed to incorporate an MWIR integration capacitor ($C_{INTMW}$) or an SWIR integration capacitor ($C_{INTSW}$) depending upon the selected mode of operation. As is well known to those skilled in the art space based infrared detection systems may be used to monitor a variety of different locations and conditions which are more effectively monitored by examining different portions of the infrared frequency spectrum. Thus, the operation of SW1 allows the circuitry to ultimately examine medium wave infrared circuitry, or short wave infrared circuitry, depending upon the condition of switch SW.

For each channel there are two sample and hold capacitors: $C_{SHS}$ for sample-and-holding the short integration time signal value, and $C_{SHL}$ for sample-and-holding the longer integration time signal value. The operation of the sample-and-hold circuits is controlled externally through a sample-and-hold clock. Thus, the ratio of short to long integration time may be externally controlled. The presently preferred embodiment was designed to operate in the ratio of short to long integration time of 16:1 and the size of the sample-and-hold capacitors were chosen for this ratio. Both $CSH_S$ and $CSH_L$ are approximately 1.5 pF. In the presently preferred embodiment the designed value for $C_{INTMW}$ was 3.9 pF, while the design value of $C_{INTSW}$ was 9 pF.

Each of the redundant channels may contain two single slope, 13-bit A/D converters, that digitize the long and short integration time sample-and-hold voltages. The sample-and-hold voltages are compared with a reference ramp voltage and, when the comparator transitions, this latches a digital word being generated by an internal counter. Both the reference ramp and the internal counter are synchronized so that the latched counter value will represent the digital value of the sample-and-hold voltage. Only one counter is required for all A/D converters. It should be recognized that the dual integration circuit of the present invention can be used in conjunction with a variety of different types of A/D converter circuits, and is not intended to be limited to use in conjunction with the particular A/D converter circuits described herein.

In the presently preferred embodiment, a 14-bit latch is used to capture the output from the 13-bit internal counter and the state of gain bit illustrated at FIGS. 1 and 2. Each channel contains a long and short integration time comparator. The output from each comparator is connected to a pulse generator that will latch the internal count just after the comparator transition. In the circuit operation, the short integration time comparator will always transition first and latch in the counter's value. If the long integration sample is not saturated, its comparator will latch in the counter's count sometime later. This will overwrite the digital word, latched by the short integration time comparator. However, if the long integration time sample is saturated, its comparator will not transition and the short integration time digital word will be used. The gain bit is preset for the high gain mode (indicating the short integration time sample is being used) and remains at this preset condition unless the long integration sample is not saturated.

In the presently preferred embodiment, the output from the chip is a serial, current mode with a gain bit followed by 13 data bits for each channel. The data output is at the A/D clock rate of 150 kHz with a logical "1" corresponding to 10 μamps and the logical "0" corresponding to 0 μamps. The presently preferred embodiment is further designed to operate at 250 millisecond frame time. Signal integration and readout take place during a 200 msec time period while the A/D conversion of the integrated signal occurs during a 30 msec time period. Also during the 30 msec period is the command and control time where the command latch may receive information to place the device in various operating modes, e.g., to select SWIR or MWIR.

Figure 3:
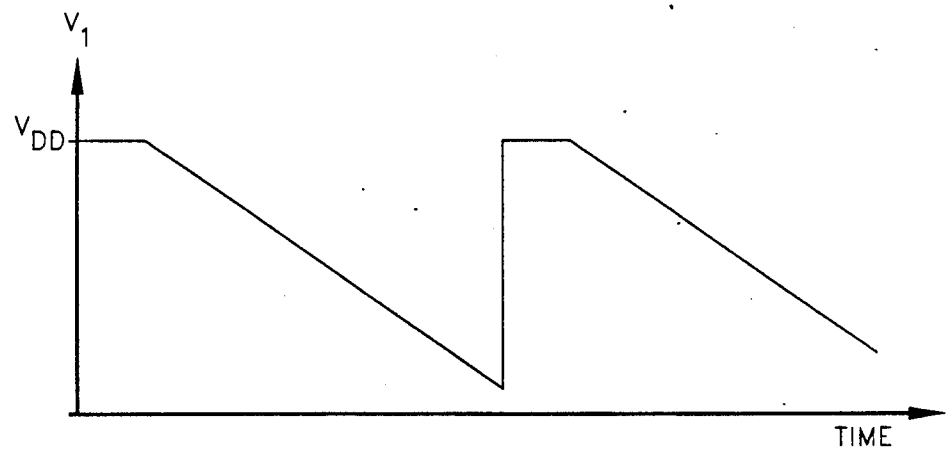
FIG. 3 is a timing diagram of signals applied to the circuit illustrated at FIG. 2.
Figure 3:
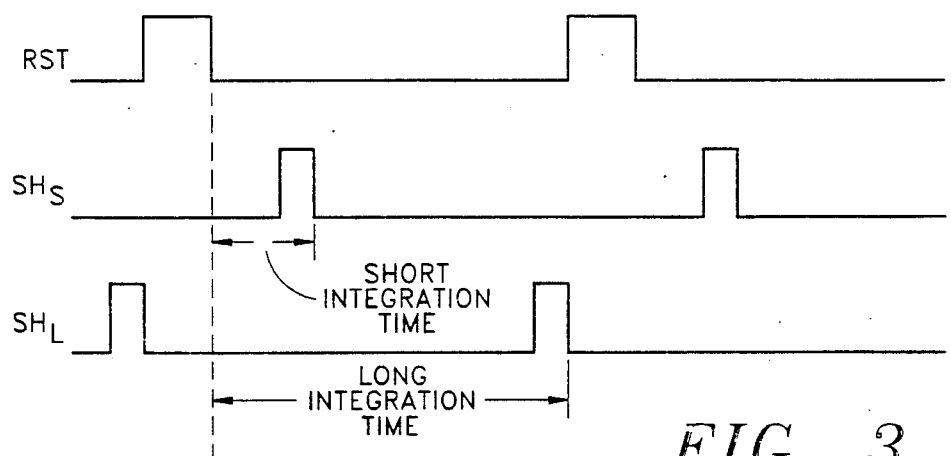

FIG. 3 illustrates certain signals generated in the course of the operation of the circuit illustrated FIG. 2. FIG. 3 illustrates the value of $V_{DD}$ in relation to the reset signal RST and the state of the short integration and long integration circuits.

As shown at FIG. 3, the operation of the reset switch (RST) causes $V_{DD}$ to return to its normal value. The pulse of signal $SH_S$ illustrates closing of switch $SH_S$ which defines the short integration time. The pulse of signal $SH_L$ illustrates the closing of switch $SH_L$ and defines the long integration time. As previously noted, the ratio of short integration time to long integration time may be varied according to design requirements. The amplitude of the signal from the input circuit, in combination with the time at which the $SH_S$ and $SH_L$ switches are closed, will determine the signal communicated to the comparator portion of the analog-to-digital converter. In the presently preferred embodiment that signal is then compared to a ramp reference signal generating an output pulse which is then communicated to the latch.

What is claimed is:

1. A method for integrating the output signal of space based infrared detectors, said method comprising the steps of:
   a) receiving the output signal of an infrared detector at an input port;
   b) simultaneously communicating the detector output signal to first and second integration circuits;
   c) integrating the detector output signal over a first time interval with the first integration circuit;
   d) simultaneously integrating the detector output signal over a second time interval with the second integration circuit, the second time interval being longer that the first time interval;
   e) latching a first counter at a first counter value when a first reference ramp signal achieves a preset value relative to the integrated value of the detector output in the first integration circuit;
   f) outputting the latched first counter value as a digital signal representative of the detector output signal in response to saturation of the second integration circuit;
   g) latching a second counter at a second counter value when a second reference ramp signal achieves a preset value relative to the integrated value of the detector output in the second integration circuit in response to non-saturation of the second integration circuit;
   h) overwriting the first counter value with the second counter value in further response to non-saturation of the second integration circuit; and
   i) outputting the latched second counter value as a digital signal representative of the detector output signal in further response to non-saturation of the second integration circuit.

2. The method as recited in claim 1 wherein the step of integrating the detector output signal over a second time interval comprises integrating the detector output signal over a second time interval which is 16 times as long as the first time interval.

3. The method as recited in claim 1 further comprising the step of communicating the digital signal to a multiplexer.

4. The method as recited in claim 1 wherein said first and second counters are defined by a single counter.

* * * * *